United States Patent
Weber

(10) Patent No.: US 11,885,950 B2
(45) Date of Patent: Jan. 30, 2024

(54) LIGHT SOURCE MODULE FOR A MICROSCOPE

(71) Applicant: LEICA MICROSYSTEMS CMS GMBH, Wetzlar (DE)

(72) Inventor: Markus Weber, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 18/155,087

(22) Filed: Jan. 17, 2023

(65) Prior Publication Data

US 2023/0236402 A1 Jul. 27, 2023

(30) Foreign Application Priority Data

Jan. 25, 2022 (EP) .................................... 22153134

(51) Int. Cl.
- *G02B 21/06* (2006.01)
- *G02B 21/36* (2006.01)
- *G02B 21/18* (2006.01)
- *G02B 21/26* (2006.01)

(52) U.S. Cl.
CPC ............. *G02B 21/06* (2013.01); *G02B 21/18* (2013.01); *G02B 21/26* (2013.01); *G02B 21/36* (2013.01)

(58) Field of Classification Search
CPC ................ G02B 21/0032; G02B 21/16; G01N 21/6458; G01N 2201/063
USPC .......................................................... 359/385
See application file for complete search history.

(56) References Cited

U.S. PATENT DOCUMENTS

| | | | |
|---|---|---|---|
| 2008/0043469 A1 | 2/2008 | Watanabe et al. | |
| 2008/0198448 A1* | 8/2008 | Ganser | G02B 21/16 359/385 |
| 2015/0202618 A1* | 7/2015 | Haga | G01N 21/6428 506/16 |
| 2015/0346474 A1* | 12/2015 | Iguchi | G02B 21/0032 359/385 |
| 2019/0049709 A1 | 2/2019 | Shimada et al. | |

FOREIGN PATENT DOCUMENTS

| | | | | |
|---|---|---|---|---|
| CN | 212840778 U | * | 3/2021 | |
| DE | 102017116892 B4 | * | 1/2022 | ......... G02B 21/0032 |

* cited by examiner

*Primary Examiner* — Tracie Y Green
(74) *Attorney, Agent, or Firm* — Leydig, Voit & Mayer, Ltd.

(57) ABSTRACT

A light source module for a microscope, including a light source configured to emit illumination light along an illumination light path, at least one light blocking shutter configured to be moved into and out of the illumination light path, and at least one light sensor configured to detect an intensity of the illumination light propagating along the illumination light path. The at least one light sensor is integrated with the at least one light blocking shutter to be moved therewith into and out of the illumination light path.

15 Claims, 8 Drawing Sheets

LIGHT SOURCE MODULE FOR A MICROSCOPE

CROSS-REFERENCE TO PRIOR APPLICATION

This application claims benefit to European Patent Application No. EP 22153134.6, filed on Jan. 25, 2022, which is hereby incorporated by reference herein.

FIELD

The present invention relates to a light source module for a microscope, comprising a light source unit configured to emit illumination light along an illumination light path.

BACKGROUND

In the field of microscopy, light sources such as a light-emitting diodes (LEDs) are used to illuminate a sample to be imaged. In order to shield the sample from the illumination light when the light source is switched on, the light source is often followed by a light blocking shutter that can be moved into the illumination light path and retracted therefrom.

For a number of reasons, it may be important to measure the intensity of the illumination light applied to the sample. For example, knowing the illumination light intensity is crucial when sensitive biological samples need to be protected from excessive light exposure. Furthermore, the illumination light intensity can be used to determine an aging condition of the light source in the context of predictive maintenance.

In order to detect the illumination intensity in conventional microscopes, light sensors such as photodiodes are used. Usually, the light sensor is positioned near but outside an illumination light path to prevent the light sensor from blocking the light propagating towards the sample. Accordingly, the light sensor measures only off-axis light such as scattered light. As a result, only a small portion of the illumination light intensity is measured which may work well for high light intensities. However, low light intensities cannot be measured accurately.

There is an alternative solution wherein the microscope comprises an optomechanical component such as a deflection mirror that is movable into the illumination light path to deflect the illumination light onto the light sensor located outside the illumination light path. However, providing an additional optomechanical element is technically complex and disadvantageous in term of costs and installation space.

SUMMARY

In an embodiment, the present disclosure provides a light source module for a microscope, comprising a light source configured to emit illumination light along an illumination light path, at least one light blocking shutter configured to be moved into and out of the illumination light path, and at least one light sensor configured to detect an intensity of the illumination light propagating along the illumination light path. The at least one light sensor is integrated with the at least one light blocking shutter to be moved therewith into and out of the illumination light path.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
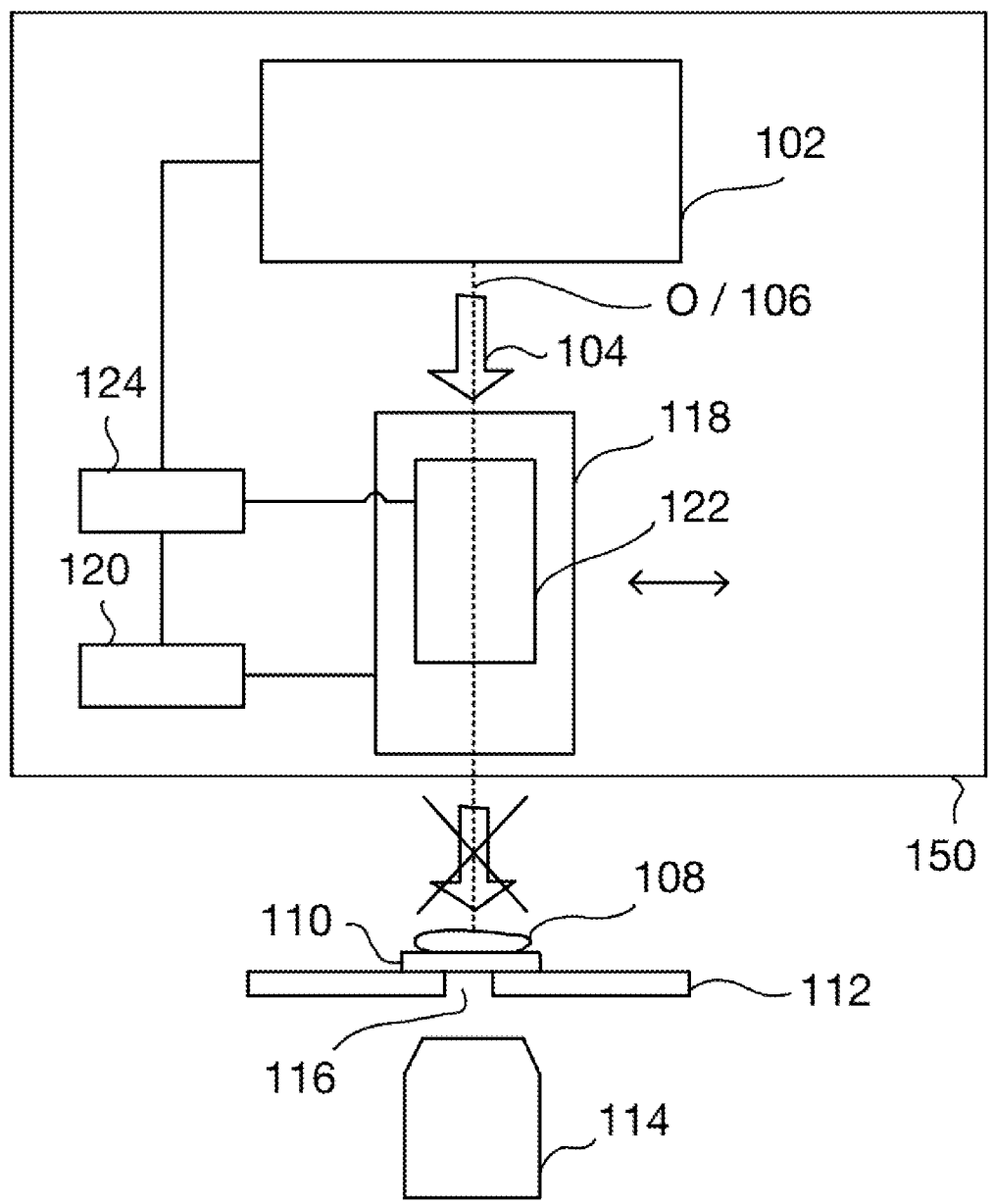
FIG. 1 illustrates a block diagram that shows a microscope with a light source module according to an embodiment.

In an embodiment, the present disclosure provides a light source module for a microscope and a method that allow the intensity of illumination light emitted from a light source to be easily yet accurately detected.

A light source module for a microscope comprises a light source unit configured to emit illumination light along an illumination light path, at least one light blocking shutter configured to be moved into and out of the illumination light path, and at least one light sensor configured to detect an intensity of the illumination light propagating along the illumination light path. The at least one light sensor is integrated with the at least one light blocking shutter to be moved therewith into and out of the illumination light path.

According to an embodiment, a light sensor such as a photodiode is integrated with a light blocking shutter which can be inserted into and retracted from an illumination light path. Therefore, it is possible to detect the intensity of the illumination light emitted by the light source unit with high precision, even if the intensity is low. This is in contrast to existing solutions where a light sensor is fixedly arranged outside the illumination light path so that the light sensor is only able to detect off-axis light such as scattered light, rendering the measurement inaccurate at low intensities. The light sensor inserted into the illumination light path is preferably arranged so that its light receiving surface lies on the optical axis defining the illumination light path.

Furthermore, the light sensor is part of the movable light blocking shutter which is included in the microscope anyway. Therefore, it is not necessary to provide additional components that are specifically designed to enable high-precision intensity measurement. This is advantageous in term of costs and installation space.

The light blocking shutter may be formed from a plate-shaped component, in particular in form of circuit board in which the light sensor is integrated. For example, control elements that are needed anyway can be accommodated on the printed circuit board to save space.

In a preferred embodiment, the light source unit comprises a plurality of light sources configured to emit a plurality of light components, wherein the light source module further comprises a beam combining device configured to combine the plurality of light components to the illumination light. Preferably, the light source is configured to emit the plurality of light components with different wavelengths. The beam combining device may comprise mirrors and/or dichroic mirrors configured to merge the different light components as desired.

The at least one light blocking shutter may comprise a single light blocking shutter located along the illumination light path downstream of the beam combining device. A single shutter can be used to efficiently measure the intensity of an illumination light beam combined from multiple light components.

In addition, or alternatively, the at least one light blocking shutter may comprise a plurality of light blocking shutters corresponding to the plurality of light sources, wherein each light blocking shutter is located along the illumination light path upstream of the beam combining device and immediately downstream of the light source which is associated with this light blocking shutter. Using multiple shutters allows the light intensities emitted by multiple light sources independently in an efficient manner.

The microscope may comprise at least one driving unit which is configured to move the at least one light blocking shutter into and out of the illumination light path. Using a driving unit to insert the light blocking shutter into the illumination light path and to retract therefrom, facilitates the operation of the light source module. For example, the driving unit may comprise a motor such as a step motor without being limited thereto. As an exemplary alternative, an electromechanical actuator such as a solenoid may be used to move the light blocking shutter into and out of the illumination light path.

The microscope may further comprise a controller which is configured to control the light sensor integrated with the light blocking shutter and/or the light unit source unit. In case that the light blocking shutter is formed by a circuit board, the controller may be integrated with the circuit board which is advantageous in terms of costs and installation space.

In a preferred embodiment, the controller is configured to cause the light sensor to detect the intensity of the illumination light propagating along the illumination light path and to cause the light source unit to adjust the intensity of the emitted illumination light depending on the detected intensity. Such an embodiment can be advantageously used to protect light sensitive samples from excessive light exposure.

The controller may further be configured to obtain calibration data and to cause the light source unit to adjust the intensity of the emitted illumination light based on the calibration data.

According to another aspect, a method for illuminating a sample by means of a light source module in a microscope is provided. The method comprises the following steps: emitting illumination light along an illumination light path onto the sample by means of a light source unit of the light source module; detecting an intensity of the illumination light propagating along the illumination light path by means of at least one light sensor which is integrated with at least one light blocking shutter of the light source module, wherein the at least one light blocking shutter is configured to be moved into and out of the optical path.

A detection of the intensity of the illumination light may be controlled according to the following sequence of steps: In a first step, the light blocking shutter is moved into the illumination light path with the light source unit turned off. In a second step, the light source unit is turned on to emit the illumination light along the illumination light path. In a third step, the intensity of the illumination light is detected by means of the light sensor integrated with the light blocking shutter. In a fourth step, the light source unit is turned off to stop the emission of the illumination light. In a fifth step, the light blocking shutter is moved out of the optical path.

According to a preferred embodiment, a predictive maintenance procedure may be executed by controlling the light source unit to emit the illumination light with a maximum intensity; comparing the intensity detected by means of the light sensor to a pre-stored nominal intensity, and generating predictive maintenance information based on a result of the comparison. For example, predictive maintenance information about the light source unit can be obtained, in particular information about aging phenomena, in case that the detected light intensity is significantly lower than the pre-stored nominal intensity.

According to another aspect, a method for calibrating the light source module is provided. The calibration method comprising the following steps: emitting the illumination light by means of the light source unit along the illumination light path with the at least one light blocking shutter being moved out of the illumination light path; detecting the intensity of the illumination light propagating along the illumination light path by means of a reference light sensor device; varying a power supplied to the light source unit until the intensity of the illumination light detected by the reference light sensor device is equal to a predetermined reference intensity; storing a value of the power, at which the illumination light detected by reference light sensor device is equal to the reference intensity, as a reference power value; moving the light blocking shutter into the illumination light path and measuring the intensity of the illumination light, which is emitted by the light source unit at the reference power value, by means of the light sensor integrated with the light blocking shutter as a reference intensity value; and determining a calibration characteristic based on the reference power value and the reference intensity value.

The obtained calibration characteristic is particularly advantageous to control the light source module in a range of lower light intensities where the characteristic often proves to be non-linear. This calibration may be performed for each light source module of an entire production series. The calibration characteristic may be stored in the respective light source module and can later be used when operating the light source module.

Figure 2:
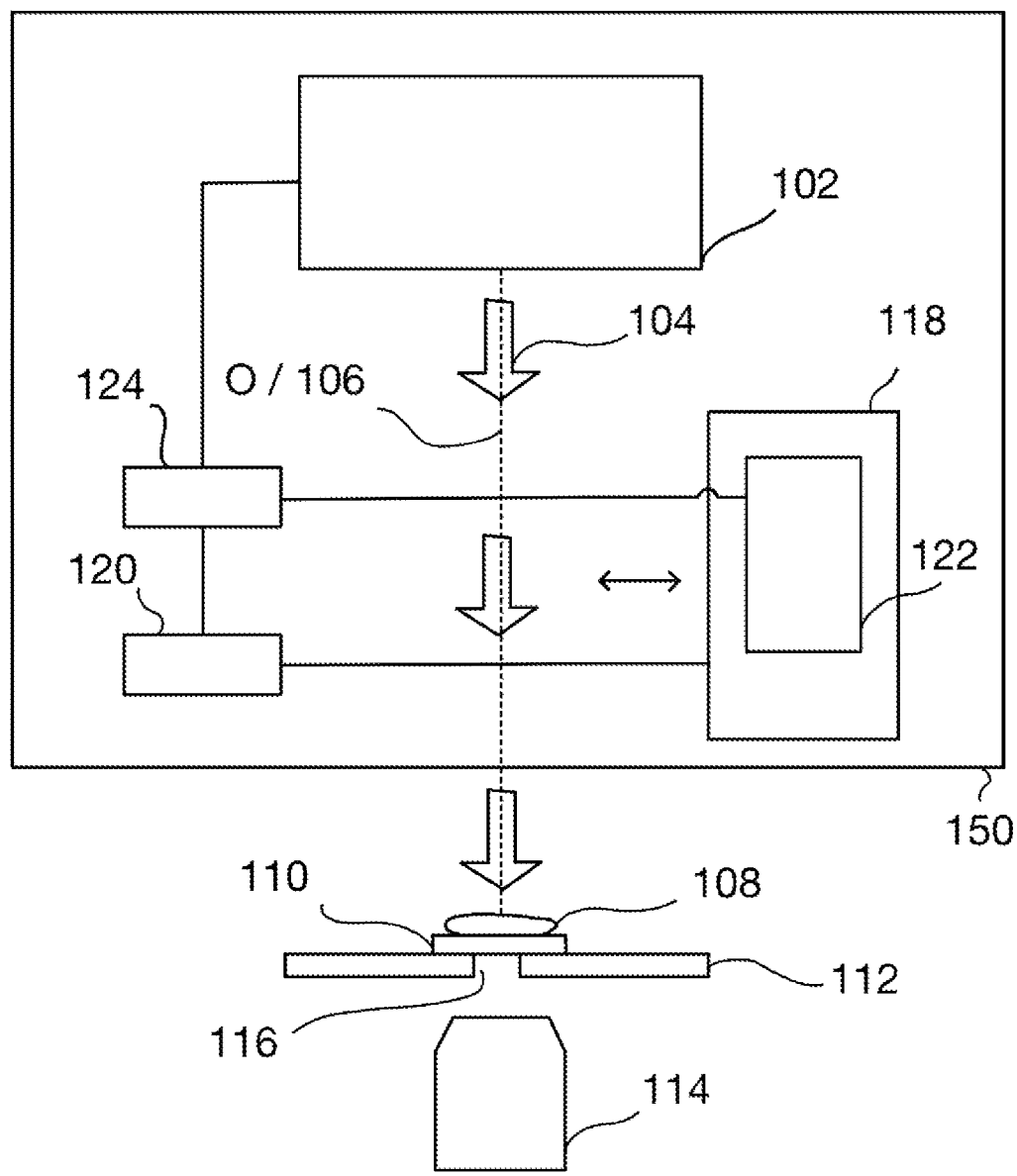
FIG. 2 illustrates a block diagram showing the microscope of FIG. 1 with the light blocking shutter being retracted from the illumination light path.

FIGS. 1 and 2 are block diagrams showing a microscope 100 according to an embodiment. The microscope 100 may be implemented as an inverted microscope without being limited thereto. It is to be noted that FIGS. 1 and 2 show only those components of the microscope 100 which are helpful to understand the operating principle of the solution presented herein. Needless to say, that the microscope 100 may include additional components not explicitly shown in the block diagrams of FIGS. 1 and 2.

As shown in FIGS. 1 and 2, the microscope 100 comprises a light source unit 102 which emits illumination light 104 along an optical axis O defining an illumination light path 106. The light source unit 102 may include a single light source or a plurality of separate light sources as explained below with reference to FIGS. 3 and 4. For example, the light source(s) may be implemented as LED(s). The illumination light path 106 is directed towards a sample 108 held by a transparent sample carrier 110 that is arranged on a microscope stage 112. According to the inverted configuration, the microscope 100 comprises an objective 114 that images the sample 104 from below the microscope stage 112 through a stage opening 116 onto an image sensor.

The microscope 100 further comprises a light blocking shutter 118 that is configured to be moved into and out of the illumination light path 106. The moving direction of the light blocking shutter 118 may be perpendicular to the optical O as indicated by a double arrow in FIGS. 1 and 2, respectively. The microscope 100 may have a driving unit 120 such as a motor, for example as a step motor, which moves the light blocking shutter 118 into and out of the illumination light path 106. Alternatively, the driving unit 120 may be formed by an electromechanical actuator such as a solenoid. The light blocking shutter 118 serves to shield the sample 108 from the illumination light 104 when the light source unit 102 is turned on and emits the illumination light 104 along the illumination light path 106. Thus, FIG. 1 shows a first operating state in which the illumination light 104 emitted from the activated light source unit 102 is prevented from reaching the sample 108 by the light blocking shutter 118. In contrast, FIG. 2 shows a second operating state in which light blocking shutter 118 clears the illumination light path 106 so that illumination light 104 emitted from the light source unit 102 is incident on the sample 108.

The microscope 100 comprises a light sensor 122 which is adapted to detect the intensity of the illumination light 104 propagating along the illumination light path 106. More specifically, the light sensor 122 is integrated with or arranged at the light blocking shutter 118 and thus movable therewith into and out of the illumination light path 106. Accordingly, the light blocking shutter 118 and the light sensor 122 may form an integrated unit which can be inserted into the illumination light path 106 to selectively prevent the illumination light 106 from reaching the sample 108 and to measure the intensity of the illumination 106 at the same time. For example, the light blocking shutter 118 may be formed by a circuit board, and the light sensor 122 may be mounted on a surface of the circuit board facing the light source unit 102 that emits the illumination light 104. This enables a light sensitive surface of the light sensor 122 to detect a significant portion of the illumination light 104 which would be incident on the sample 108 when the illumination light path 106 is cleared by retracting the light blocking shutter 118 therefrom.

As a result, the intensity of the illumination light 104 can be measured with high accuracy, even if the intensity is low. This distinguishes the solution presented herein from conventional systems in which the light sensor is fixed outside the illumination light path so that the light sensor is dependent on detecting only off-axis light such as scattered light, which makes the measurement inaccurate at low intensities.

In addition, as the light sensor 122 is integrated with the light blocking shutter 118, which is a component already present in the microscope 100, a highly accurate intensity measurement can be achieved without having to provide additional components such as an optomechanical used in existing microscopes. This is advantageous in term of costs and installation space.

Although the light blocking shutter 118 is illustrated in FIGS. 1 and 2 as a single shutter, it is to be noted that the microscope 100 may also have multiple, preferably identical, light blocking shutters, in particular in case that the light source unit 102 includes multiple light sources. In such a case, each light blocking shutter may be assigned in a one-to-one configuration to a specific light source. It should be noted in particular that all embodiments disclosed herein refer to both a single light source configuration and a multiple light source configuration, unless explicitly stated otherwise. This applies in particular to the calibration method explained below.

According to the embodiment shown FIGS. 1 and 2, the microscope 100 includes a controller 124 which is adapted to control operations of the light source unit 102, the motor 120 and the light sensor 122 integrated with the light blocking shutter 118. In particular, the controller 124 may cause the light sensor 122 to measure the intensity of the illumination light 104. For this purpose, the controller 124 outputs a drive signal to the motor 120. Based on the drive signal, the motor 120 moves the light blocking shutter 118 together with the light sensor 122 from a non-operating position shown in FIG. 2, in which the light blocking shutter 118 is retracted from the illumination light path 106, into an operating position shown in FIG. 1, in which the light blocking shutter 118 is inserted in the illumination light path 106. Subsequently, the controller 124 turns the light source unit 102 on, if it has not already done so, and causes the light sensor 122 to perform a measurement of the intensity of the illumination light 104 emitted from the light source unit 102. In turn, the controller 124 receives a detection signal from the light sensor 122.

The light source unit 102, the light blocking shutter 118 with its integrated light sensor 122, the motor 120, and the controller 124 are included in a light source module 150. The light source module 150 may be configured as an essentially self-contained unit of the microscope 100. For example, the illumination light 104 output from the light source module 150 may be transmitted through an optical fiber to the sample 108.

Figure 3:
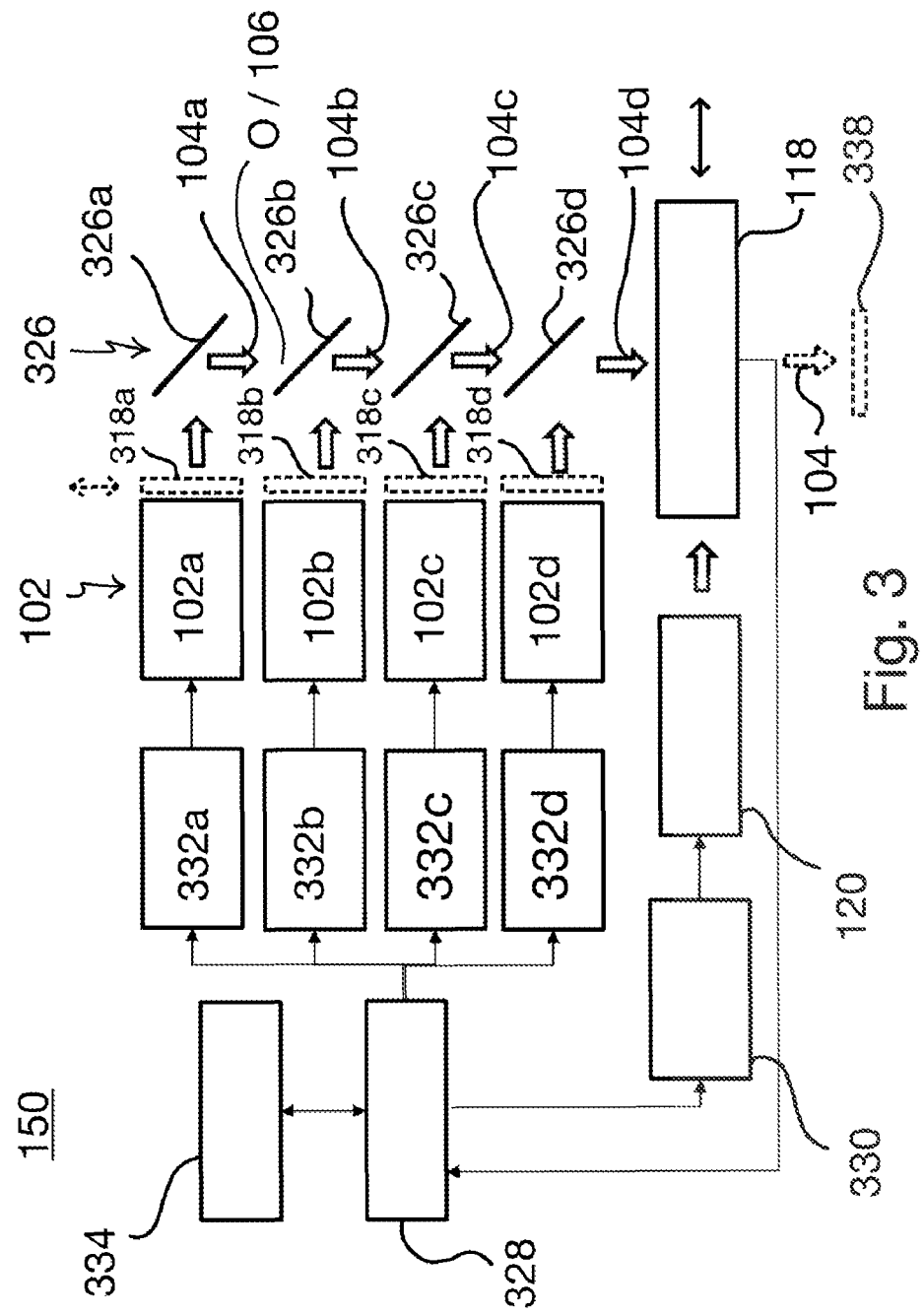
FIG. 3 illustrates a block diagram showing an embodiment of a light source module which comprises a plurality of light sources and associated light blocking shutters.

FIG. 3 is a block diagram showing an embodiment of the light source module 150 in which the light source unit 102 comprises multiple light sources 102a, 102b, 102c, and 104d. For simplicity, components of the microscope 100, which are arranged in the illumination light path 106 downstream of the light module 150, are omitted in FIG. 3.

The multiple light sources 102a, 102b, 102c, 102d may be configured to emit a plurality of light components 104a, 104b, 104c, 104d, respectively. The light sources 102a, 102b, 102c, 102d may be LEDs of different colors. Specifically, the LEDs may generate illumination light of different wavelengths adapted to excite various fluorophores included in the sample to emit fluorescent light. According to the embodiment shown in FIG. 3, the multiple light components 104a, 104b, 104c, 104d emitted by the light sources 102a, 102b, 102c, 102d are collinearly combined into a resulting light beam which eventually illuminates the sample. To this end, the light source module 150 may comprise a beam combining device 326 that is adapted to merge the light components 104a, 104b, 104c, 104d to light beam irradiated onto the sample. The beam combining device 326 may comprise multiple components which serve to couple the different light components 104a, 104b, 104c, 104d sequentially into the illumination light path 106 in which the combined light beam ultimately propagates to the sample.

More specifically, the beam combining device 326 includes a deflection mirror 326a which faces the first light source 102a and reflects the first light component 104a emitted therefrom into the illumination light path 106. In addition, the beam combining device 326 includes a first dichroic beam splitter 326b facing the second light source 102b. The first dichroic beam splitter 326b reflects the second light component 104b emitted by the second light source 102b into the illumination light path 106 and transmits the first light component 104a already propagating along the illumination light path 106. In addition, the beam combining device 326 includes a second dichroic beam splitter 326c facing the third light source 102c. The second dichroic beam splitter 326c reflects the light component 104c emitted by the third light source 102c into the illumination light path 106 and transmits the light components 104a and 104b already propagating along the illumination light path 106. In addition, the beam combining device 326 includes a third dichroic beam splitter 326d facing the fourth light source 102d. The third dichroic beam splitter 326d reflects the light component 104d emitted by the fourth light source 102d into the illumination light path 106 and transmits the light components 104a, 104b, and 104c already propagating along the illumination light path 106.

According to the embodiment shown FIG. 3, the light blocking shutter 118 is formed by a single shutter which is arranged in the illumination light path 106 downstream of the beam combing device 326, in particular downstream of the last dichroic beam splitter 326d. As explained above with reference to FIGS. 1 and 2, the light blocking shutter 118 including the light sensor 122 is movable into and out of the illumination light path 106 by means of the motor 120 that is driven by the controller 122. In addition to a microcontroller (μC) 328, the controller 122 may include a motor driver 330 connected to motor 120.

Instead of or in addition to the single light blocking shutter 118, as shown by dashed lines in FIG. 3, it is also possible to provide multiple light blocking shutters 318a, 318b, 318c, and 318d with integrated light sensors. In that case, each light blocking shutter 318a, 318b, 318c, and 318d may be assigned to one of the multiple light sources 102a, 102b, 102c, 102d. In particular, each light blocking shutter 318a, 318b, 318c, 318d may be located along the illumination light path 106 upstream of the beam combining device 326 and immediately downstream of the respective light source 102a, 102b, 102c, 102d. In other words, each light blocking shutter 318a, 318b, 318c, 318d is positioned with the light receiving surface of its light sensor facing the associated light source 102a, 102b, 102c, 102d in order to detect only illumination light emitted from that light source. As noted above, the light blocking shutters 318a, 318b, 318c, 318d may preferably be substantially identical components.

The controller 122 may further comprise multiple light source drivers (amplifiers) 332a, 332b, 332c, and 332d, each of which being coupled to one of the multiple light sources 102a, 102b, 102c, and 102d. Thus, each light source 102a, 102b, 102c, 102d is controlled by the microcontroller 328 and the associated light source driver. Furthermore, a personal computer (PC) 334 may be provided enabling a user to operate the configuration shown in FIG. 3. For example, based on desired illumination light intensities input by the user via the PC 334, the microcontroller 328 outputs control signals to the light source drivers 332a, 332b, 332c, 332d. Then, the light source drivers 332a, 332b, 332c, 332d cause the light sources 102a, 102b, 102c, 102d to emit the different light components 104a, 104b, 104c, 104d with the desired light intensities. Furthermore, the light sensor integrated with the light blocking shutter 118 and/or the light sensors integrated with the light blocking shutters 318a, 318b, 318c, 318d detect the respective light intensities and output detection signals to the microcontroller 328 which processes the received detection signals.

As explained above, the light sources 102a, 102b, 102c, and 102d can be used simultaneously in order to create a resulting light beam including all wavelengths provided by the light sources. Alternatively, it is also possible to use only one or some of the light sources 102a, 102b, 102c, and 102d at a time.

Figure 4:
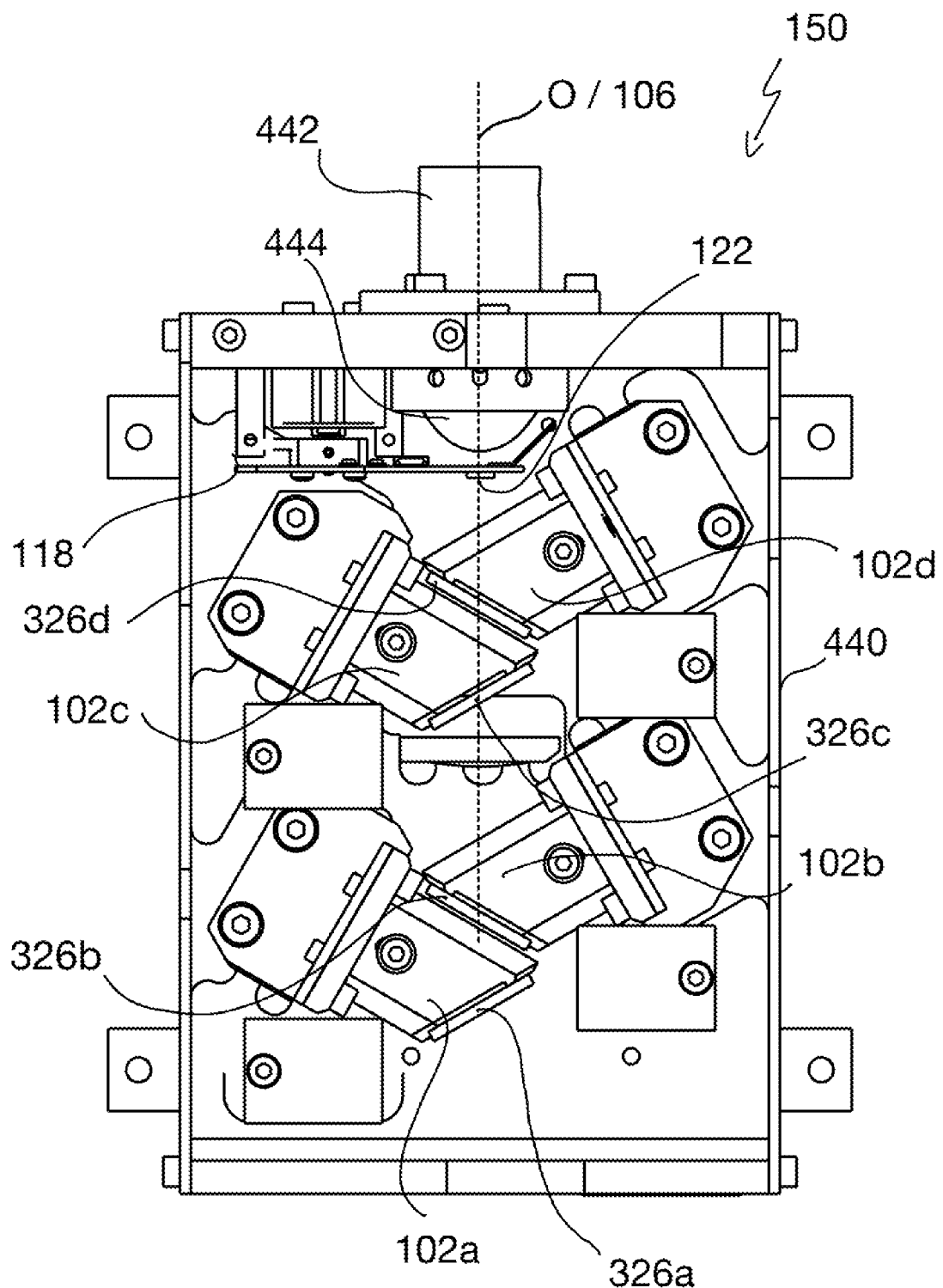
FIG. 4 illustrates a plan view diagram showing the structure of the light source module of FIG. 3.

FIG. 4 is a plan view showing a structural implementation of the light source module 150 shown in FIG. 3. In particular, FIG. 4 serves to illustrate a positional relationship of the light sources 102a, 102b, 102c, 102d, the beam combining device 326, and the light blocking shutter 118 with the integrated light sensor 122 within the light source module 150. It goes without saying that the configuration shown in FIG. 4 is to be understood as an illustrative example only. Various other structural implementations are conceivable.

The light source module 150 comprises a module casing 440 which houses the afore-mentioned module components. As can be seen in FIG. 4, the deflection mirror 326a and the dichroic beam splitters 326b, 326c, 326d of the beam combining device 326 are arranged to be directly opposite the associated light source 102a, 102b, 102c, and 102d, respectively. Each of these components 326a, 326b, 326c, 326d of the beam combining device 326 is arranged at angle to the optical axis O such that the illumination light reflected by the respective component propagates along the optical axis O defining the illumination path 106. FIG. 4 also shows that the light sensor 122 formed on the light blocking shutter 118 is preferably positioned on the optical axis O when the light blocking shutter 118 is its operating state, which means that it is inserted into the illumination light path 106. In that state, the light blocking shutter 118 covers an output lens 444 which is optically coupled to an optical fiber 442 so that the illumination light is prohibited from reaching the output lens 444. If the light blocking shutter 118 is retracted from the illumination light path 106, the illumination light reaches the output lens 444 and is transmitted through the optical fiber 442 towards the sample.

Figure 5:
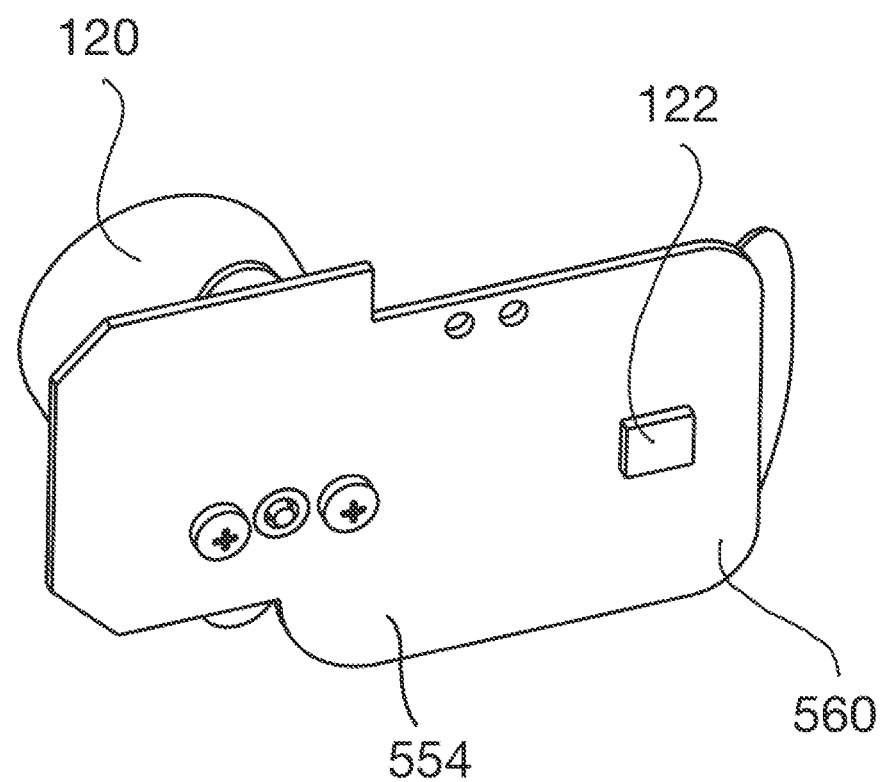
FIG. 5 illustrates a perspective view showing the light blocking shutter with the integrated light sensor according to an embodiment.
Figure 6:
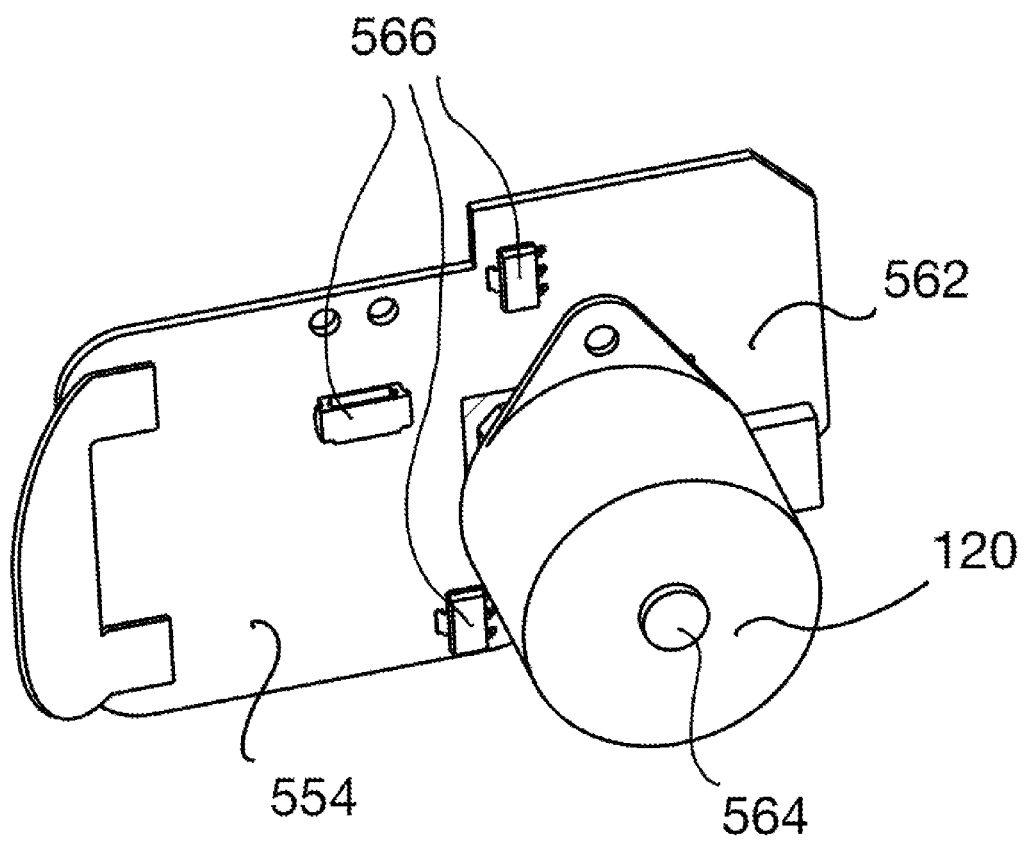
FIG. 6 illustrates another perspective view of the light blocking shutter shown in FIG. 5.
Figure 7:
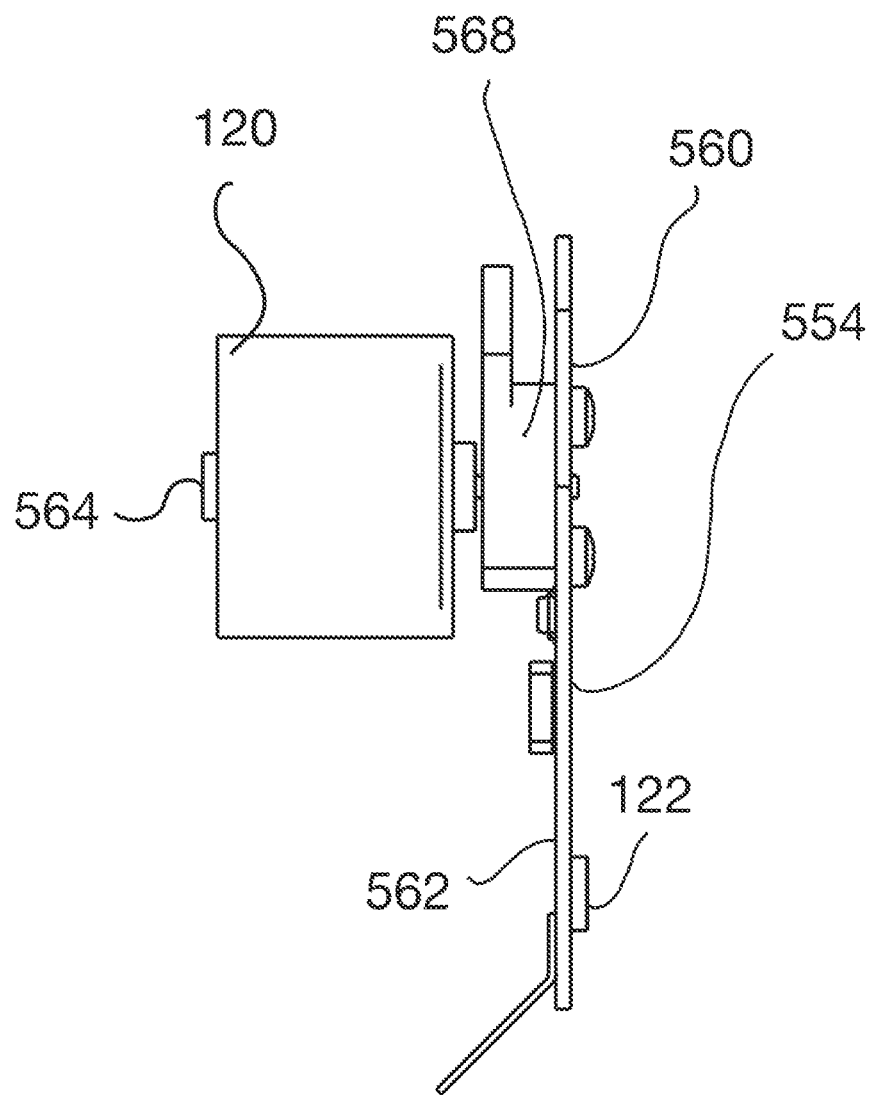
FIG. 7 illustrates a top view of the light blocking shutter shown in FIG. 5.

FIGS. 5 to 7 are different views of the light blocking shutter 118 according to an embodiment. The light blocking shutter 118 may be formed by a plate-shaped component, in particular a circuit board 554, as already mentioned above.

As shown in the perspective view of FIG. 5, the light sensor 122 is mounted on a front surface 560 of the light blocking shutter 118, the front surface 560 facing the light source unit 102. On an opposite rear surface 562, the motor 120 is coupled to the light blocking shutter 118 as shown in FIG. 6. Being formed as circuit board, the light blocking shutter 118 may include a plurality of electronic components 566 such ICs as shown in FIG. 6. The motor 120 may be configured to pivot the light blocking shutter 118 into and out of the illumination light path via a rotatable shaft 564 which coupled to a mounting portion 568 arranged on the rear surface 562 of the light blocking shutter 118 as shown in FIG. 7.

Figure 8:
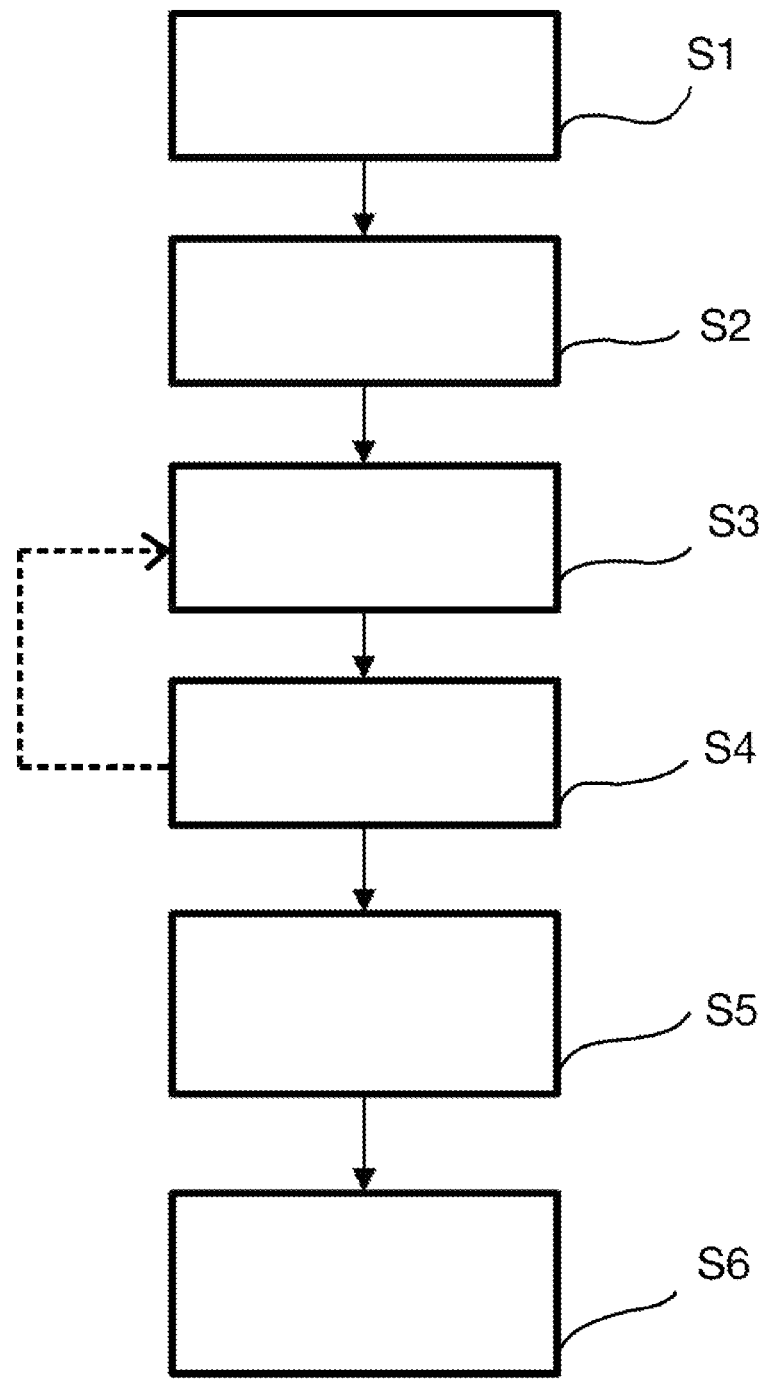
FIG. 8 illustrates a flow diagram showing a method for detecting an intensity of the illumination light by means of the light sensor formed on the light blocking shutter according to an embodiment.

FIG. 8 is a flow diagram showing a method for detecting the intensity of the illumination light 104 according to an embodiment. With reference to FIG. 8, it is assumed that the intensity of the illumination light 104 is measured by a single light blocking shutter such as the shutter 118 shown in FIGS. 1 to 3. However, the method can also be applied for measuring the intensities of multiple illumination components emitted by multiple light sources. In this case, a configuration with multiple light blocking shutters may be used as indicated in FIG. 3 by the shutters 318a, 318b, 318c, 318d.

Hereinafter, it is assumed that the light source unit 102 is turned off at the beginning of the method shown in FIG. 8.

Thus, in S1, the controller 124 causes the motor 120 to move the light blocking light shutter 118 with the integrated light sensor 122 turned off from a retracted position into the illumination light path 106.

Subsequently, in step S2, the controller 124 turns the light source unit 102 on to emit the illumination light 104 along the illumination light path 106 with the light sensor 122 formed on the light blocking light shutter 118 being arranged therein to receive the emitted illumination light 104.

In step S3, the controller 124 causes the light source unit 102 to emit the illumination light 104 with a desired intensity which may be specified by the user, for example by a corresponding input on the PC 334.

In step S4, the controller 124 causes the light sensor 122 integrated with the light blocking shutter 118 to measure the intensity of the illumination light incident on the light receiving surface of the light sensor 122.

In step S5, the controller 124 turns the light source unit 102 off. Finally, in step S6, the controller 124 causes the motor 120 to retract the light blocking light shutter 118 from the illumination light path 106.

The method described above can be used advantageously to protect the sample 108 from excessive light exposure which is important, for example, in experiments involving biological samples that are known to be light sensitive. In particular, it is possible to control the light source unit 102 during the experiment depending on the intensity measured by the light sensor 122.

Furthermore, the light intensity measurement integrated into the light blocking shutter 118 can be used for predictive maintenance. For example, in step S3 of the method shown in FIG. 8, the light source unit 102 can be controlled to emit the illumination light 104 with maximum intensity. The intensity of the illumination light 104 detected by the light sensor 122 in step S4 may then be compared to a pre-stored nominal intensity which has been determined at the beginning of the lifetime of the light source unit 102. In this manner, predictive maintenance information about the light source unit 102, in particular information about aging phenomena, can be obtained. It is to be noted that a comparison of the light intensity detected by the light sensor 122 to a pre-stored nominal intensity is not limited to a single pair of intensity values. Rather, multiple comparative measurements may be performed as indicated by the dashed loop between steps S3 and S4 in FIG. 8, for example in the context of predictive maintenance, but also in the context of calibration, as explained hereinafter.

A calibration of the light source unit 102 may be implemented based on a series of light intensity measurements established by repeatedly executing steps S3 and S4 in FIG. 8. For example, it is assumed that one of the LEDs 102a, 102b, 102c, 102d is to be calibrated using its associated light blocking shutter 318a, 318b, 318c, 318d with the integrated light sensor.

As an example, assume a production series including products such as the LEDs mentioned above to be calibrated in the manufacturing stage. Furthermore, assume that a maximum permissible intensity of the emitted illumination light is specified for this LED type. The entire operating range of the LED type is assumed to be 0% to 100%, wherein the value 100% is normalized to the maximum permissible light intensity. Then, a transfer of the value of 100% to the entire production series can be achieved if all LEDs of the production series are calibrated such that all LEDs obtain at least one identical reference point.

For such a calibration, an external reference sensor device 338 may be used during production as indicated in FIG. 3 by dashed lines. The external reference sensor device 338 is configured to measure the intensity of the light emitted by the LED with absolute accuracy. For example, the external reference sensor device 338 may be coupled to an output of the LED-shutter module 150 including the LED(s) to be calibrated in order to measure the illumination light intensity emitted by the LED(s) with absolute accuracy.

Firstly, the light blocking shutter including the light sensor is retracted from the illumination light path 106. Subsequently, an electrical LED power energizing the LED to emit the illumination light is adjusted, and the corresponding intensity of the illumination light emitted by the LED is measured by means of the external reference sensor device 338. This adjustment process is carried out until the external reference sensor device 338 measures the maximum permissible light intensity which corresponds to a first LED power. After that, the light blocking shutter including the light sensor is moved into the illumination light path 106, and the intensity of the illumination light emitted from the LED is measured by the light sensor. The measured light intensity is stored. As a result, a first pair of measured values is obtained, this first pair consisting of the first LED power mentioned above and the light intensity measured by the light sensor integrated with the light blocking shutter at 100%. A further light intensity measurement by means of the external reference sensor device 338 is not necessary for calibrating the specific light source module 150.

Subsequently, a measurement series is performed iteratively, in which the illumination light intensity is set in a desired granularity and the resulting LED power is stored. Accordingly, the measurement series sets the adjusted values of the LED power in relation to the measured values of the illumination light intensity. This results in a characteristic allowing the adjustable LED power to be exactly assigned to the desired light intensity, which is particularly advantageous in a range of lower light intensities where the characteristic curve is not linear. This calibration process is performed for each light source module of the production series to create a calibration characteristic that is specific for this light source module. The calibration characteristic is stored in the respective light source module and can later be used when operating the light source module. As a result, all modules of production series are calibrated.

Such a calibration process results in a light source module which is capable of emitting illumination with reproducible light intensities. Accordingly, the user is enabled to repeat an experiment reliably at any time. Furthermore, reproducibility is not only given for a specific light source module but to the whole production series. Thus, the user can perform the same experiment with the same light intensity at different locations. This is an important aspect in the field of research, as reproducibility in microscopic imaging depends on many factors.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

- 100 microscope
- 102 light source unit
- 102a, 102b, 102c, 102d multiple light sources
- 104 illumination light
- 104a, 104b, 104c, 104d multiple light components
- 106 illumination light path
- 108 sample
- 110 sample carrier
- 112 microscope stage
- 114 objective
- 116 stage opening
- 118 light blocking shutter
- 120 motor
- 122 light sensor
- 124 controller
- 150 light source module
- 318a, 318b, 318c, 318d light blocking shutter
- 326 beam combining device
- 326a deflection mirror
- 326b, 326c, 326d dichroic beam splitter
- 328 microcontroller
- 330 motor driver
- 332a, 332b, 332c, 332d light source driver
- 334 personal computer
- 338 external reference light sensor
- 440 module casing
- 442 optical fiber
- 444 output lens
- 554 circuit board
- 560 front surface
- 562 rear surface
- 564 shaft
- 566 electronic component
- 568 mounting portion

The invention claimed is:

1. A light source module for a microscope, comprising:
   a light source configured to emit illumination light along an illumination light path,
   at least one light blocking shutter configured to be moved into and out of the illumination light path, and
   at least one light sensor configured to detect an intensity of the illumination light propagating along the illumination light path,
   wherein the at least one light sensor is integrated with the at least one light blocking shutter to be moved therewith into and out of the illumination light path.

2. The light source module according to claim 1, wherein the light blocking shutter is designed as a circuit board in which the light sensor is integrated.

3. The light source module according to claim 1, wherein the light source comprises a plurality of light sources configured to emit a plurality of light components, and
   wherein the light source module further comprises a beam combiner configured to combine the plurality of light components to the illumination light.

4. The light source module according to claim 3, wherein the at least one light blocking shutter comprises a single light blocking shutter located along the illumination light path downstream of the beam combiner.

5. The light source module according to claim 3, wherein the at least one light blocking shutter comprises a plurality of light blocking shutters corresponding to the plurality of light sources, each light blocking shutter being located along the illumination light path upstream of the beam combiner and immediately downstream of the light source associated therewith.

6. The light source module according to claim 1, comprising at least one driver configured to move the at least one light blocking shutter into and out of the illumination light path.

7. The light source module according to claim 1, comprising a controller configured to control the light sensor integrated with the light blocking shutter and/or the light source.

8. The light source module according to claim 7, wherein the controller is configured to cause the light sensor to detect the intensity of the illumination light propagating along the illumination light path and to cause the light source to adjust the intensity of the emitted illumination light depending on the detected intensity.

9. The light source module according to claim 7, wherein the controller is configured to obtain calibration data and to cause the light source to adjust the intensity of the emitted illumination light based on the calibration data.

10. A microscope, comprising:
    the light source module according to claim 1.

11. A method for illuminating a sample by a light source module in a microscope, comprising:
    emitting illumination light along an illumination light path onto the sample by a light source of the light source module, and
    detecting an intensity of the illumination light propagating along the illumination light path by at least one light sensor which is integrated with at least one light blocking shutter of the light source module, the at least one light blocking shutter being configured to be moved into and out of the illumination light path.

12. The method according to claim 11, wherein the light source is controlled depending on the intensity detected by the light sensor in order to protect the sample from excessive light exposure.

13. The method according to claim 11, wherein a detection of the intensity of the illumination light is controlled according to the following sequence of steps:

in a first step, the light blocking shutter is moved into the illumination light path with the light source turned off, in a second step, the light source is turned on to emit the illumination light along the illumination light path, in a third step, the intensity of the illumination light is detected by means of the light sensor integrated with the light blocking shutter, in a fourth step, the light source is turned off to stop the emission of the illumination light, and in a fifth step, the light blocking shutter is moved out of the optical path.

14. The method according to claim 11, wherein a predictive maintenance procedure is executed by controlling the light source to emit the illumination light with maximum intensity, comparing the intensity detected by the light sensor to a pre-stored nominal intensity, and generating predictive maintenance information based on a result of the comparison.

15. A method for calibrating the light source module according to claim 1, comprising:

emitting the illumination light by means of the light source along the illumination light path with the at least one light blocking shutter being moved out of the illumination light path, detecting the intensity of the illumination light propagating along the illumination light path by a reference light sensor, varying a power supplied to the light source until the intensity of the illumination light detected by the reference light sensor is equal to a predetermined reference intensity, storing a value of the power, at which the illumination light detected by the reference light sensor is equal to the reference intensity, as a reference power value, moving the light blocking shutter into the illumination light path and measuring the intensity of the illumination light emitted, which is emitted by the light source at the reference power value, by the light sensor integrated with the light blocking shutter as a reference intensity value, and determining a calibration characteristic based on the reference power value and the reference intensity value.

\* \* \* \* \*